United States Patent [19]
Georgescu

[11] Patent Number: 5,222,317
[45] Date of Patent: Jun. 29, 1993

[54] TETHERED FLOATING FISH CATCHING DEVICE

[76] Inventor: George Georgescu, 1301 Ann Ave., Humble, Tex. 77338

[21] Appl. No.: 925,509

[22] Filed: Aug. 5, 1992

[51] Int. Cl.⁵ .......................................... A01K 61/00
[52] U.S. Cl. ............................................ 43/4; 43/17; 43/42.74
[58] Field of Search ............... 43/4, 18.1, 43.1, 43.15, 43/42.74

[56] References Cited

U.S. PATENT DOCUMENTS

| | | | |
|---|---|---|---|
| 2,779,122 | 1/1957 | De Groff | 43/44.9 |
| 3,577,669 | 5/1971 | Johnson | 43/44.88 |
| 3,714,731 | 2/1973 | Benson | 43/44.88 |
| 3,745,692 | 7/1973 | McGee | 43/42.74 |
| 3,805,438 | 4/1974 | McLaughlin | 43/42.74 |
| 4,486,969 | 12/1984 | Swenson | 43/17 |
| 4,934,090 | 6/1990 | Storey et al. | 43/17 |
| 5,048,219 | 9/1991 | Georgescu | 43/4 |

Primary Examiner—Richard K. Seidel
Assistant Examiner—Chuck Y. Mah
Attorney, Agent, or Firm—James L. Jackson

[57] ABSTRACT

A tethered, floating fishing device is provided having a depending anchor post to which is connected an anchor by means of an anchor line. The apparatus incorporates a generally circular float having upper and lower sharp circular edges formed respectively by upper and lower flat plates. A rod and line connector post extends upwardly from the float and provides support for a plurality of elongate flexible fishing rods that are disposed in upwardly diverging relation. Fishing lines, secured to a line connector assembly at the upper portion of the rod and line connector post extend through line support loops located at the free extremity of the flexible fishing rods and extend downwardly to the surface of the water at locations spaced from the float. Fishing hooks may be secured to the fishing line in positions to locate bait fish at or near the water surface, or if desired, the lines may be of additional length so as to selectively position the bait fish at desired levels beneath the surface. Location of the bait fish at the surface enables the live bait to create sufficient surface disturbance to attract large fish that swim upwardly and strike the bait fish. The anchor post is of greater length than the rod and line connector post to provide the float with stabilizing ballast.

20 Claims, 2 Drawing Sheets

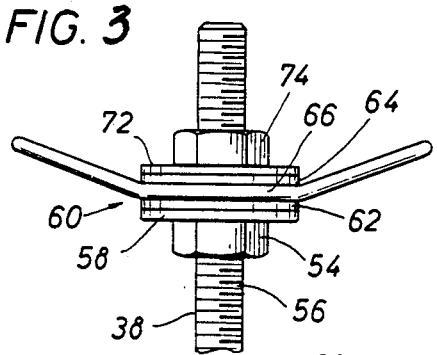
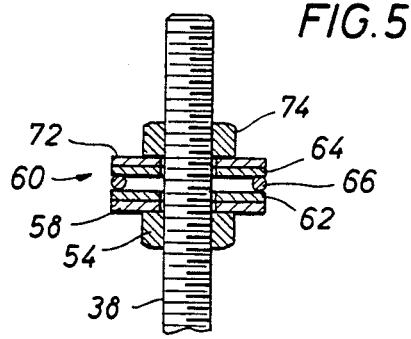
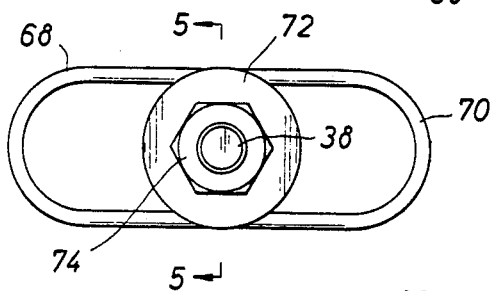
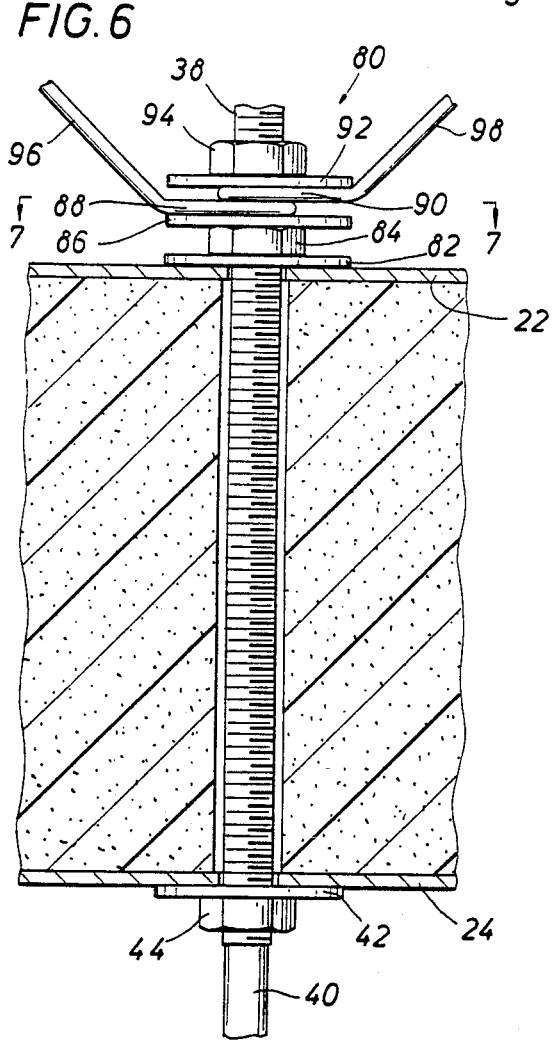
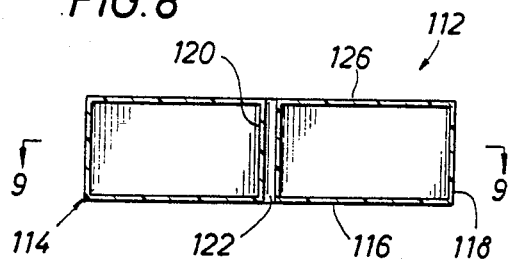
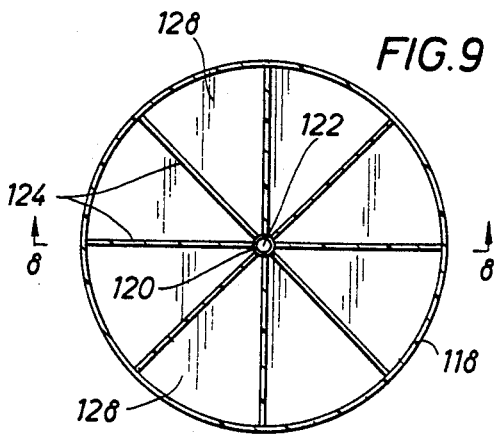

1

TETHERED FLOATING FISH CATCHING DEVICE

FIELD OF THE INVENTION

This invention relates to apparatus for catching fish and more particularly to a tethered floating fish catching device that floats on the surface of the water and which is capable of being inverted by the force of a biting fish to expose an attention attracting surface. Even more specifically, this invention concerns a tethered floating fish catching device of generally flat configuration and having a substantially large dimension causing the device to function as a water brake restraint for quickly tiring a caught fish and causing the fish to remain in the immediate area where caught until the fish and the device are retrieved. This invention further concerns the provision of flexible fishing rods on a floating tethered fish catching device, which rods are each at an angle permitting fishing lines from the free ends thereof to extend downwardly into the water on opposite sides of the float and at a considerable distance from the float.

BACKGROUND OF THE INVENTION

In most cases recreational fishing is accomplished by providing a fishing line which is attached to a fishing pole, rod and reel, etc. and which is used to locate a baited hook in a desired location for catching fish. When a fish is attracted to the bait and upon biting is caught by the hook, the fisherman, who must typically continuously attend the fishing line becomes aware of the caught fish and retrieves the fish by means of the fishing line. In some cases for recreational fishing, trot lines and throw lines are employed for location of a plurality of fishing stagings and hooks along a main fishing line. The hooks of the trot line or throw line are baited and typically left for an extended period during which fish bite and are caught by the hooks and are restrained by the hooks and stagings until later retrieved. Trot lines and throw lines are difficult and time consuming to install and they require considerable maintenance. At times they require special licenses to enable fishing. Trot lines typically require open water for location and through lines require access to a fishing area from the shore. These factors tend to restrict usage of trot lines and throw lines for spot fishing activities.

In virtually all cases during recreational fishing activities, the caught fish are restrained by a trot line, throw line, and/or fishing line, etc. for significant periods of time. The fisherman will inspect the lines, typically once or twice a day, to retrieve caught fish and to rebait the empty hooks. In many cases caught fish die and become spoiled before being retrieved. Many large fish escape because the stagings are broken or the hooks are straightened by the force applied by the fish. It is desirable, therefore, to provide a tethered fish catching device that floats in a body of water and enables location of bait fish at or near the surface of the water to provide the capability of attracting fish to be caught by means of surface disturbance created by the bait fish. It is also desirable to provide a tethered floating fish catching device which may be effectively used in moving water and which provides for catching of the fish, and functioning as a water brake to quickly tire the fish and minimize movement of the fish after the same is caught. It is further desirable to provide a fish catching device which is effective for catching large fish and which cannot be overstressed and permit line breakage by the fish, no matter how large. It is also desirable to provide a fish catching device which effectively enables the fish to remain alive for long periods of time during absence of the fisherman.

DESCRIPTION OF THE PRIOR ART

U.S. Pat. No. 2,799,122 of De Groff discloses a turnover float which is turned over by a biting fish to provide an indication that the fish has been caught and which is tethered by means of a fishing line 12 which is retrieved in customary fashion by means of a fishing pole, rod and reel, etc. to retrieve the float and the fish. Other patents of interest to this invention are U.S. Pat. Nos. 3,524,277 of Neubert; 3,714,731 of Benson; 3,3486,969 of Swenson and 4,934,090 of Storey.

SUMMARY OF THE INVENTION

It is a principle object of this present invention to provide a novel tethered floating fish catching device which is adapted to float on the surface of a body of water during fishing activities while being tethered by a restraining line connected to an anchor resting on the bottom of the body of water.

It is also a feature of this invention to provide a novel floating fish catching device having the capability of becoming inverted due to the force of a biting fish and to expose an attention attracting surface and thus provide an indication to a fisherman that may be some distance away from the site that a fish has been caught.

It is also a feature of this invention to provide a novel tethered, floating fish catching device which effectively prevents over-stressing and breaking of fishing lines even when the fish being caught is capable of applying sufficient force to break the fishing line.

It is an even further feature of this invention to provide a novel free floating fish catching device having a large diameter and being of generally circular configuration and further having at least one and preferably a plurality of flexible fish restraining rods extending angularly from the central portion thereof for presenting bait fish at or near the surface of the water.

It is also a feature of this invention to provide a novel tethered fish catching float wherein the float is of circular, sharp edged configuration, thus enabling the device to function as a water brake to quickly tire caught fish and restrain fish movement after the fish are caught.

It is also a feature of this invention to provide a novel tethered floating fish catching device which is of generally flat configuration having one or more fish restraining connectors extending angularly from the center thereof and which functions by guiding its swimming movement and by providing a water braking action to maintain a fish at the immediate vicinity of its location when caught until such time as the device and fish are retrieved.

Briefly, the tethered floating fish catching device of the present invention is in the form of a generally flat, circular configuration of considerable thickness and having a post or rod extending centrally therethrough and having rod sections extending both above and below flat, planar upper and lower surfaces. The rod section extending above the planar upper surface of the circular float comprises a rod and line connector post. A pair of flexible rods are secured by the post immediately adjacent the upper surface of the circular float and are oriented in upwardly, diverging relation with one another. The rods diverge upwardly and outwardly sufficiently that fishing lines depending vertically from the tips of the flexible rods will come into contact with the water at the sides of the float and at a sufficient distance away from the float that striking fish will not be disturbed and deterred by the presence and bulk of the large float. Typically, the flexible rods are disposed in opposed relation such that vertical fishing lines extend to the water at positions substantially equally spaced from respective edges of the float. The fishing rods, however, may be of differing lengths for positioning of bait fish at differing distances from the float if so desired.

The upper portion of the rod and line connector post is provided with a line connector defining at least one and preferably two or more line connector loops to which the fishing line of the respective flexible rods is secured. The fishing line thus extends from the respective connector loops through eyes at the free end of the flexible rods and thence downwardly into the water. The line connector loops also serve to receive the fish hooks for disabled, safe storage when fishing activities are not being conducted.

An anchor post, which may comprise the lower end of the rod and line connector post, projects downwardly from the lower planar surface of the float and is preferably of equal or greater length as prepared to that of the rod and line connector post. The weight of the anchor post provides ballast for enhancing the stability of the float and to resist its disturbance by wind, wave action, etc. The anchor post is provided with an anchor connector at its lower end forming a connector eye through which an anchor rope is connected. The anchor rope is provided with an anchor at its lower extremity which rests on the bottom of the body of water when the fishing apparatus is being utilized and which is of a length to maintain the anchor line fairly taut to minimize lateral movement of the float.

The basic central structure of the tethered floating fish catching device includes a generally circular core of buoyant material such as styrofoam, having substantially flat upper and lower surfaces and having a circular outer peripheral edge of cylindrical configuration. The upper and lower surfaces of the fish catching device are defined by generally planar, circular plates which may be formed of any of a wide variety of materials including aluminum, polymer, etc. The bottom circular plate is preferably of a color which does not disturb the fish to be caught and which attracts the attention of the fisherman when the float becomes inverted by a striking fish.

The tethered fish catching device is typically placed in floating condition on the surface of a body of water with the anchor line extending substantially vertically to the bottom of the body of water with the anchor line preferably fairly taut to cause the floating fish catching device to maintain a fairly static location at the surface of the water. When a fish strikes one of the bait fish and becomes hooked, the fish will attempt to swim away from the fish catching device and will also tend to swim downwardly toward the bottom of the body of water. When this occurs, the fish catching device will become inverted, thus presenting its attention attracting bottom surface for visual inspection by the fisherman. The bottom surface is of a suitable color to provide the fisherman with a visual indication even from a significant distance, that a fish has been caught by the device. As the fish attempts to swim downwardly from the surface toward the bottom of the body of water, the large, circular float of the device will function as a water brake and will cause the fish to become quickly tired. Because the fish will be able to two the float through the water, the fishing line will encounter only the force of the water resistance and buoyancy of the float. This force will be insufficient to overstress and break the fishing line. Further, because the upper and lower peripheral edges of the circular float are formed of metal, the edge surfaces of the float will be quite sharp. As the caught fish struggles and swims away from the device, these sharp circular edges form a steering or directional controlling function, causing the fish to swim in a circular pattern. This also causes the caught fish to be quickly tired so that it can be easily retrieved by the fisherman. The tethering capability provided by the anchor will also prevent the device from being towed any significant distance by the fish that is caught, even under circumstances where the fish is of large size and of considerable endurance.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings

FIG. 1 is an elevational view shown in partial section representing a tethered, floating fish catching device that is constructed in accordance with the principles of the present invention and illustrating surface positioning of bait fish during fishing activities.

FIG. 2 is an elevational view of the tethered floating fish catching device of FIG. 1 being shown in its inverted position after having caught a fish.

FIG. 3 is a fragmentary elevational view of the upper portion of the rod and line connector post of the device of FIGS. 1 or 6 showing the line connector thereof in detail.

FIG. 4 is a plan view of the line connector structure of FIG. 3.

FIG. 5 is a sectional view of the upper portion of the rod and line connector posts being taken along line 5—5 of FIG. 4.

FIG. 6 is a fragmentary sectional view of the central portion of a tethered floating fishing device representing an alternative embodiment of this invention, illustrating the central threaded rod and its attachment to the float and the flexible rod securing mechanism of the fish catching device.

FIG. 7 is a sectional view taken along line 7—7 of FIG. 6 and showing assembly of one of the flexible rods to the rod and line connector post.

FIG. 8 is a sectional view of the compartmented float portion of a tethered floating fish catching device representing an alternative embodiment of this invention.

FIG. 9 is a plan view of the float body taken along line 9—9 of FIG. 8 with the float cover removed.

DETAILED DESCRIPTION OF PREFERRED EMBODIMENT

Figure 1:
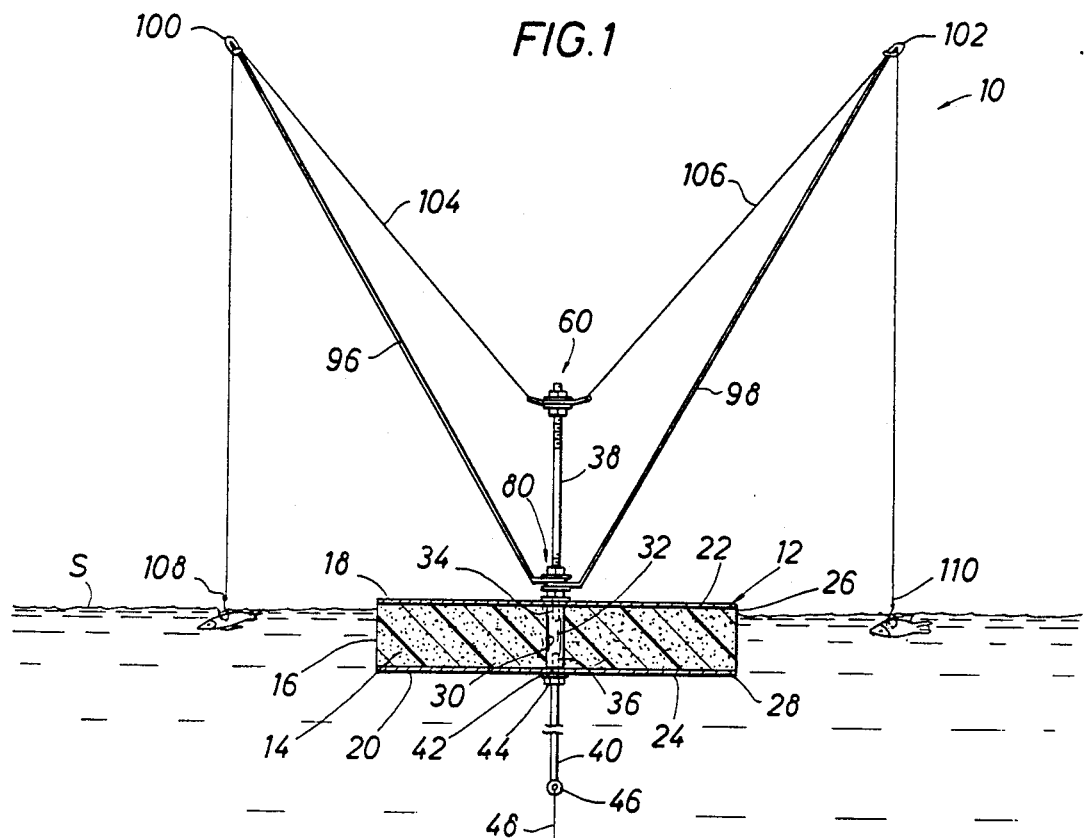
Figure 2:
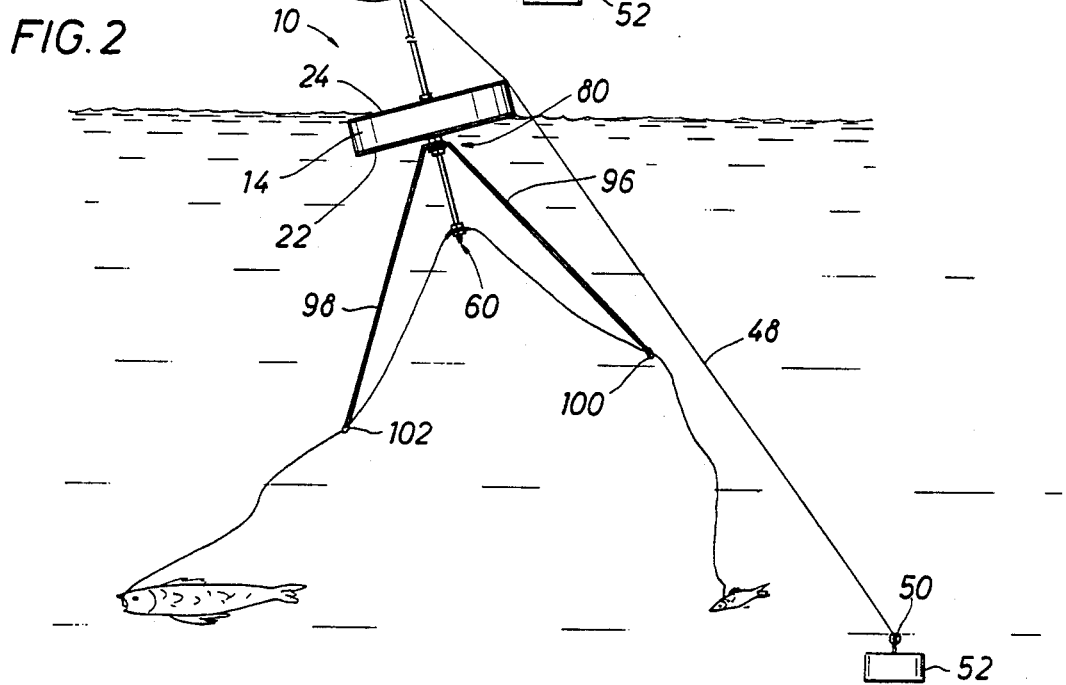

Referring now to the drawings and first to FIGS. 1 and 2, the tethered floating fish catching device of this invention, shown generally at 10 is shown to include a large, circular float illustrated generally at 12 and incorporating a thick central core 14 composed of buoyant material such as styrofoam. If desired, the central core 14 may be of hollow construction and may be composed of a thermoplastic polymer or any other suitable material. If of hollow construction, the central core 14 may include a number of internal partitions dividing the central core into a plurality of air-tight, sealed compartments such as shown in FIGS. 8 and 9, thus providing the float with an overall buoyant capability similar to that of the embodiment of FIGS. 1 and 2.

The outer surface of the cylindrical core 14 will typically be of cylindrical configuration as shown at 16 while the upper and lower surfaces 18 and 20 of the central buoyant core will be of planar, circular configuration. The upper and lower surfaces of the float member 12 will be of planar circular configuration and will be defined by plates composed of durable material to resist wear or damage during transportation and use. It has been determined that a light-weight metal, such as aluminum may be employed to provide upper and lower metal sheets or laminations 22 and 24. The circular metal float laminations 22 and 24 define outer edges 26 and 28 respectively that overly the outer circular edges of the core 14 and thus provide the float construction with sharp upper and lower circular edges. These sharp circular edges are important from the standpoint of controlling movement of a caught fish as the fish attempts to swim away from the fish catching device and downwardly from the surface of the water. The sharp edges essentially "bite" into the water and effectively retard movement of the fish. The biting circular edges of the float also provide a "steering" action causing the caught fish to swim in a circle while swimming against the braking force of the float. Further, the circular planar surfaces defined by the upper and lower plates 22 and 24 function effectively as a water brake that resists movement of the fish. The net result is that a caught fish tending to fish downwardly and away from the fish catching device will swim in the path of least resistance. This is typically a circular path such that a caught fish tends to swim circularly within a very small area until the fish becomes tired and ceases to struggle. The float of the apparatus is of considerable dimension and is particularly designed for the catching of large fish, i.e., fish in the order of from 5 to 25 pounds or more. Thus, the float 12 may be in the order of from 10 to 30 inches in diameter and from two inches to six inches in thickness. One suitable design of the fish catching device incorporates a float having a diameter of 20 inches and a buoyant core thickness of four inches. The upper and lower plates 22 and 24, though preferably composed of a light weight metal such as aluminum, may be composed of a polymer material, or any other material having significant durability and strength. These protective plates are preferably releasably secured to the buoyant core of the float but if desired, they may be bonded to the float or formed integrally with the structure of the float.

The float 12 defines a central passage 30 within which may be located a connector element 32 having upper and lower internally threaded openings 34 and 36 respectively. A rod and line connector post 38 is provided with a lower threaded extremity which is received within the internally threaded opening 34. Likewise, an anchor post 40 is provided with an upper threaded extremity which is received within the internally threaded opening 36 and which is locked with respect to the connector 32 by means of a washer 42 and lock nut 44. The lower end of the anchor post defines an anchor eye 46 which enables connection thereto of an anchor line 48. The anchor line is in turn connected to the connector eye 50 of an anchor 52. Typically, the anchor 52 is simply a weight that rests on the bottom of the body of water. The anchor line 48 is typically adjusted such that it is fairly taut and thus functions to restrain the float 12 in a fairly stationary position on the surface of the body of water. This feature prevents wave action on the surface from turning the float over and also provides to restrain the fish that is caught to the immediate local of the tethered float. the anchor post 40 will typically be of greater length than the length of the line connector post so that its weight provides ballast that stabilizes the bait presenting floating position of the float. This ballast stabilization will be overcome by the force of a striking fish as will be described in greater detail herein below, causing the float to become inverted. When the fish catching device becomes inverted in response to the force applied by a fish being caught, as shown in FIG. 2, the anchor line 48 and anchor weight 52 will be fairly taut as shown. The anchor post 40, whether of the same length as the rod and line connector post 38 or of greater length than post 38 will be of considerable length. This feature provides a considerable anchor post lever arm and provides ballast that stabilizes the float and resists undesirable inverting of the float such as due to wind, wave action, etc.

For the purpose of fishing activities utilizing the tethered floating fish catching device 10, it should be born in mind the fish catching device is particularly designed for the catching of large fish, in the order of from 5 pounds to 50 pounds or more. Though the fish catching device may be left unattended for periods of time, its most practical utilization is accomplished when the fisherman is continuously attending it during use such as by visiting the site periodically to replace or change out the bait. Typically the bait is in the form of large live bait fish which should remain alive, fresh and active.

As mentioned above, a rod and line connector post 38 extends above the upper plate 22 of the float structure 12. If desired, the post 38 may be a separate component, attached to a central connector element 32 such as shown in FIG. 1 or preferably the post 38 may be integral with the anchor post 40 such as is evident from the embodiment shown in FIG. 6. At the upper portion of the rod and line connector post 38, as best shown in FIGS. 3, 4, and 5, a support nut 54 is received by the external threads 56 of the line connector post 38 to provide an adjustable seat for a support washer 58. The support washer, in turn, provides support for a line connector assembly shown generally at 60 and incorporating upper and lower plates 62 and 64 between which are located a line connector element 66 having opposed line connector loops 68 and 70. The line connector loops also serve as retainers for the fish hooks when the device is not being employed for fishing activities. The line connector element 66 and the plates 62 and 64 are welded or otherwise interconnected so as to form an integral line connector assembly. The line connector loops are angulated upwardly as is evident from FIG. 3.

Although the apparatus is shown to incorporate two opposed line connector loops 68 and 70, it should be born in mind that any suitable number of line connector loops may be employed in the line connector assembly within the spirit and scope of the present invention. The line connector assembly is completed by means of a containment washer 72 and a lock nut 74. By loosening the support nut 54 and the lock nut 74, the line connection assembly may be adjusted up or down relative to the threaded post 38. The threaded post may be an all-thread post such as shown in FIG. 6, or, in the alternative, it may be a post having threads at each end such as shown in FIG. 1.

It is well known that most large fish remain fairly close to the bottom of bodies of water and to catch them it is necessary either to suspend bait to a location near the bottom of the water or to develop a disturbance at the surface for the purpose of attracting the attention of the fish so that they will swim to the surface and attack the bait. Although the present invention may be employed to suspend bait at a level near the bottom of the water, or at any suitable depth within the water, it is most effective for catching fish when utilized in the manner which presents live, active bait fish at or near the surface of the water and causes the bait fish to continuously create a disturbance at the surface. This activity apparently stimulates large fish to the extent that they will swim to the surface and attack the bait fish. As shown in FIG. 1 and in greater detail in FIG. 6, a rod connection assembly is shown generally at 80 and incorporates a washer 82 which is secured against the float cover plate 22 by means of a lock nut 84. A rod support plate 86 is seated against the upper surface of the lock nut 84 and provides for retention of rod connectors 88 and 90 which define connector eyes that are received about the post 38. Typically, the rod connector elements are looped about the rod and line connector post 38 in the manner shown in FIG. 7. A retainer plate 92 is received by the post 38 and is disposed in engagement with the upper portion of the rod connector element 90. The retainer plate 92 is secured in locking position relative to the post 38 by means of a lock nut 94.

From the respective rod connectors 88 and 90 extend upwardly diverging flexible fishing rods 96 and 98 having line connector loops 100 and 102 at the upper, free extremities thereof. The upwardly diverging flexible rods 96 and 98 are composed of any suitable flexible elongate material such as spring steel, polymer, etc. It is only necessary that the material of the rods 96 and 98 be capable of flexing to absorb the force of a striking fish, without taking on a permanent deformation. The flexible fishing rods 96 and 98 are of sufficient length and are of a suitable upwardly diverging inclination to position the line connector loops 100 and 102 at positions outboard of the cylindrical surface 16 of the float. Thus the fishing lines 104 and 106 extend from the line orienting loops 100 and 102 vertically to the water surface S and will be located sufficiently away from the float that the striking fish will not be disturbed or repelled by the presence of the float. By providing large fish hooks 108 and 110 at the respective ends of the fishing lines and at a location at or near the water surface S, bait fish secured by the fishing hooks will be positioned near the water surface. These bait fish are typically hooked so that they will remain active for extended periods of time. During fishing for large fish the bait fish will typically be in the form of average to small sized perch or the equivalent. Typically, the bait fish will have the capability of pulling the flexible rods downwardly to a limited extent. Thus, as one bait fish attempts to swim downwardly away from the water surface, it will pull its fishing line and fishing rod downwardly. This pulls the opposite rod and line upwardly thus causing the opposite bait fish to be forced to the surface where it typically attempts to swim away from the surface and creates a significant water disturbance at the surface. It will then tend to swim downwardly thus pulling its rod downwardly, thus pulling the opposite bait fish upwardly. The bait fish will thus create sufficient alternating disturbance at the surface that large fish, which typically reside at or near the bottom of the water, will swim to the surface to investigate the disturbance and will be attracted to and strike the bait fish.

When a large fish strikes a bait fish and becomes hooked, it will pull downwardly sufficiently that the fishing device will be inverted in the manner shown in FIG. 2. Inversion of the float 12 in this manner causes the attention attracting color of the bottom plate 24, to be visible to the fisherman. A fisherman will thus be able simply to look at several of the fishing devices floating in the water and will be able to readily ascertain that one or more of them will have caught a fish or will at least will have had a significant strike at the bait to cause inversion of the float.

Because the fishing lines 104 and 106 are typically quite short, the fish that is caught will attempt to swim downwardly to the bottom of the water or to some other cover. In doing so, the fish will tow the float through the water. The circular configuration of the float, together with its buoyancy, and because of its sharp external circular edges, will typically cause the fish to swim in a downward, circular manner in an attempt to escape from the fishing device. Any attempts of the caught fish to pull the fishing device through the water will cause the flat upper surface 22 thereof to be pulled against the water, thereby causing a braking action. The braking action is also developed simply because of the buoyancy of the device. The braking force however is well within the structural integrity of the fishing line so that the fishing line does not become overstressed and broken. The sharp circular edges of the float develop a steering function which tends to provide significant resistance to movement of the fish. Since the caught fish will typically move in the direction of least resistance, the steering edges will cause the fish to swim in a circle. This circular swimming movement will quickly tire the fish so that when the fish becomes subdued it will typically be located very near the initial location of the fishing device. Further, the anchor 52, though not particularly an extremely heavy weight, will nonetheless provide sufficient additional retardance against fish movement in the water that the caught fish will not travel far from the initial location of the device. The caught fish will also tend to swim in circular manner about the location of the anchor 52 because such is the path of least resistance. A fish that might otherwise be capable of towing the fishing device a considerable distance will nevertheless be found at a location very close to the point that it was originally hooked simply because of the tendency for it to swim in a circular pattern, due to the braking and steering capability of the fishing device, until it becomes tired and subdued.

Although the float of the tethered fishing device is shown in FIGS. 1–6 as having a buoyant core and being provided with upper and lower substantially rigid, circular plates, it may be appropriate to manufacture the float such that it is of hollow, buoyant configuration by virtue of air contained within a plurality of internal compartments thereof. Accordingly, the float of the present invention may conveniently take the form illustrated in FIGS. 8 and 9 wherein a circular core is shown generally at 112 and incorporates a core body shown generally at 114 and incorporating a circular bottom wall 116 and a cylindrical outer wall 118. Internally, the core body defines a generally cylindrical tubular structure 120 forming a vertical passage 122 through which may be extended the respective line connector and anchor posts 38 and 40 of FIG. 1. Also internally, the float body 114 may be provided with a plurality of vertically oriented partitions 124 which are preferably integral with the cylindrical tubular element 120 and the outer circular wall 118. Typically, the float body structure 114 may be a molded structure, molded of a polymer material by any suitable molding process such as injection molding, blown molding, compression, etc. Forming a sealed closure for the float body structure 114 is a closure plate 126 which may also be molded from a polymer material or a material of any other suitable composition. The closure plate may be sealed with respect to the cylindrical outer wall 118 and the upper edges of the partitions 124 thereby forming within the float structure, a plurality of air tight compartments 128. If by some chance the float should become punctured or otherwise develop a leak, water will enter only one or two of the water tight compartments. There will therefore remain a sufficient number of the sealed compartments 128 to enable the float to remain in a buoyant condition so that the float may be retrieved and repaired.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and embraced therein.

What is claimed is:

1. A floating fishing device for use in a body of water having a water surface, comprising:
   (a) a float having a central portion and defining an upper surface;
   (b) a rod and line connector post projecting upwardly from said central portion of said float and defining an upper extremity;
   (c) a plurality of elongate flexible fishing rods each having a lower extremity secured to said connector post at a location adjacent said float and having a free extremity, said elongate flexible fishing rods projecting upwardly from said connector post and in sufficiently diverging relation with one another for location of said free extremities of said elongate flexible fishing rods vertically above points being laterally spaced from said float, said elongate flexible fishing rods each having line loops at said free extremities thereof; and
   (d) line connector means being mounted in fixed relation on said rod and line connector post and providing for connection of fishing lines thereto such that when said float is located on said body of water said fishing lines connected to said line connector element extend through said line loops of said elongate flexible fishing rods and thence vertically to said water surface at said laterally spaced points.

2. The floating fishing device of claim 1, wherein said float comprises:
   (a) a central core of buoyant material;
   (b) upper and lower generally rigid plates being disposed in face-to-face assembly with said central core; and
   (c) means retaining said generally rigid upper and lower plates in assembly with said central core.

3. The floating fishing device of claim 2, wherein:
   (a) said central core is of circular configuration defining a cylindrical outer surface and having substantially parallel upper and lower surfaces; and
   (b) said upper and lower generally rigid plates are of flat, circular configuration and define sharp circular outer peripheral upper and lower edges of said float.

4. The floating fishing device of claim 3, including:
   (a) a central connector element extending centrally through said central core and defining upper and lower post receptacles;
   (b) said connector post being a rod and line connector post being connected to said upper post receptacle and securing said lower extremities of said elongate flexible fishing rods in fixed relation with said float; and
   (c) an anchor post being connected to said lower post receptacle and projecting below said float, said anchor post defining a connector for receiving an anchor line.

5. The floating fishing device of claim 2, including:
   a line connector assembly being provided at said upper extremity of said rod and line connector post and providing connectors for attachment of fishing lines thereto.

6. The floating fishing device of claim 5, wherein:
   said line connector assembly having a plurality of line connector loops, one line connector loop being provided for each fishing rod with which said float is provided.

7. The floating fishing device of claim 1, wherein:
   (a) said rod and line connector post defines a threaded section;
   (b) said plurality of elongate flexible fishing rods each having rod connectors at said lower extremities being received about said rod and line connector posts, said rod connectors each defining an opening through which said rod and line connector post extends and being disposed in superposed relation; and
   (c) lock means being received by said threaded section of said rod and line connector post and securing said rod connectors of said pair of elongate flexible fishing rods in fixed assembly with said rod and line connector post.

8. The floating fishing device of claim 7, wherein said lock means comprises:
   (a) a lower support plate being received by said rod and line connector post and supporting said superposed rod connectors;

(b) a retainer plate being received by said rod and line connector post and being in engagement with the uppermost of said superposed rod connectors; and (c) a lock nut being received by said threaded section of said rod and line connector post and being in compressive engagement with said retainer plate, thus securing said retainer plate, said superposed rod connectors, and said support plate in fixed assembly with said rod and line connector post.

9. The floating fishing device of claim 8, wherein: said rod connectors are rod connector loops defined at the respective lower extremities of said plurality of elongate flexible fishing rods and are received about said rod and line connector post, said rod connector loops being retained in superposed abutting assembly between said support plate and said retainer plate.

10. The floating fishing device of claim 1, wherein:
(a) said float defines a vertically oriented central passage;
(b) an elongate threaded post extending through said central passage of said float and being secured in fixed relation with said float by upper and lower lock nut and washer assemblies, said elongate threaded post defining said rod and line connector post extending above said float and an anchor post extending below said float; and
(c) said line connector means being disposed at the upper extremity of said rod and line connector post.

11. The floating fishing device of claim 10, wherein said line connector means comprises:
(a) a support nut being receivable by said elongate threaded post;
(b) a lock nut being received by said elongate threaded post;
(c) a line connector assembly being positioned about said rod and line connector post and being secured in fixed relation with said rod and line connector post and between said support nut and said lock nut; and
(d) said line connector assembly defining radially projecting line connector loops each extending toward respective ones of said plurality of elongate flexible fishing rods.

12. A tethered floating fishing device for use in a body of water having a water surface, comprising:
(a) a large, generally circular buoyant float defining upper and lower generally parallel, planar surfaces and a generally cylindrical edge surface said float further defining a vertically oriented central passage;
(b) a pair of substantially rigid plates of circular configuration being retained in assembly with said upper and lower planar surfaces of said float and defining upper and lower sharp circular edges of said float, said upper and lower generally circular plates each further defining a central opening in registry with said vertically oriented central passage of said buoyant float;
(c) a rod and line connector post extending through said vertically oriented central passage and being fixed to said float and projecting upwardly therefrom;
(d) a plurality of elongate flexible fishing rods each defining lower extremities and free extremities, said lower extremities each being secured to said rod and line connector post, said elongate flexible fishing rods projecting upwardly from said float and in sufficiently diverging relation with one another for location of said free extremities of said elongate flexible fishing rods vertically above points being laterally spaced from said float, said plurality of elongate flexible fishing rods having line loops at said free extremities thereof; and
(e) a line connector element being mounted on said rod and line connector post at a location spaced above said float and providing for connection of fishing lines thereto such that when said tethered floating fishing device is located on said body of water said fishing lines extend from said line connector element through said line loops of respective elongate flexible fishing rods and thence vertically to said water surface at said laterally spaced points.

13. The tethered floating fishing device of claim 12, wherein said buoyant float comprises:
(a) a central core of buoyant material;
(b) said substantially rigid plates being disposed in face-to-face assembly with said buoyant central core; and
(c) locking elements being secured to said rod and line connector post and retaining said generally rigid upper and lower plates in assembly with said buoyant central core.

14. The tethered floating fishing device of claim 13, wherein:
(a) said buoyant central core is of circular configuration defining a cylindrical outer edge surface and having substantially parallel upper and lower surfaces; and
(b) said substantially rigid plates are of flat, circular configuration and define sharp circular outer peripheral upper and lower edges of said buoyant float.

15. The tethered floating fishing device of claim 12, wherein:
said line connector element defines a plurality of connector loops, one connector loop being provided for each elongate flexible fishing rod with which said buoyant float is provided.

16. The tethered floating fishing device of claim 12, wherein:
(a) said rod and line connector post extends upwardly from the central portion of said float and defines a threaded section;
(b) said plurality of elongate flexible fishing rods having rod connectors at said lower extremities thereof being received about said threaded section of said rod and line connector post and being disposed in superposed relation; and
(c) lock means being received by said threaded section of said rod and line connector post and securing said superposed rod connectors of said elongate flexible fishing rods in fixed assembly with said rod and line connector post.

17. The tethered floating fishing device of claim 16, wherein said lock means comprises:
(a) a lower support plate being received by said rod and line connector post and supporting said superposed rod connectors;
(b) a retainer plate being received by said rod and line connector post and being in engagement with the uppermost of said superposed rod connectors; and
(c) a lock nut being received by said threaded section of said rod and line connector post and being in compressive engagement with said retainer plate, thus securing said retainer plate, said superposed rod connectors, and said support plate in fixed assembly with said rod and line connector post.

18. The tethered floating fishing device of claim 17, wherein:
   said rod connectors are loops defined at the respective lower extremities of said plurality of elongate flexible fishing rods and are received about said rod and line connector post, said rod connector loops being retained in superposed abutting assembly between said support plate and said retainer plate.

19. The floating fishing device of claim 12, wherein said line connector element comprises:
   (a) a support nut being receivable by said rod and line connector post;
   (b) a lock nut being received by said rod and line connector post;
   (c) a line connector assembly being positioned about said rod and line connector post and being secured in fixed relation with said rod and line connector post and between said support nut and said lock nut; and
   (d) said line connector assembly defining radially projecting line connector loops extending toward said respective ones of said plurality of elongate flexible fishing rods.

20. The floating fishing device of claim 12, wherein:
   said rod and line connector post also defines an anchor post extending downwardly from said buoyant float and defining a lower extremity, said anchor post being of greater length than said rod and line connector post and defining an anchor line connector eye at said lower extremity.

* * * * *